United States Patent [19]

Sieber et al.

[11] 4,063,142

[45] Dec. 13, 1977

[54] SERVO SYSTEM FOR TRIP RECORDER

[75] Inventors: Manfred Sieber, Villingen; Manfred Fichter, Weiler; Ingo Müller, Schwenningen, all of Germany

[73] Assignee: Kienzle Apparate GmbH, Villingen-Schwenningen, Germany

[21] Appl. No.: 577,996

[22] Filed: May 16, 1975

Related U.S. Application Data

[63] Continuation of Ser. No. 118,070, Feb. 23, 1971, abandoned.

[30] Foreign Application Priority Data

Feb. 24, 1970 Germany .................... 2008403

[51] Int. Cl.² ............................ G01P 3/46; G05F 1/00
[52] U.S. Cl. ............................. 318/678; 324/163; 361/242

[58] Field of Search .................... 318/678, 609; 317/5; 361/242; 324/163

[56] References Cited

U.S. PATENT DOCUMENTS 3,480,859 11/1969 Fichter .................... 317/5 X

OTHER PUBLICATIONS

"An-20 An Applications Guide for Operational Amplifiers" National Semiconductor Corp. Feb. 1969, pp. 1,3.

Primary Examiner—Robert J. Hickey
Attorney, Agent, or Firm—Michael J. Striker

[57] ABSTRACT

The output of an operational amplifier is connected to a bridge having as its diagonal two push-pull, complementary-symmetry, output stages, the servo motor being connected between the emitters junction of the one stage and the emitters junction of the other stage.

5 Claims, 2 Drawing Figures

SERVO SYSTEM FOR TRIP RECORDER

CROSS REFERENCE TO RELATED APPLICATIONS

This application is a continuation of application Ser. No. 118,070, filed on Feb. 23, 1971, now abandoned.

BACKGROUND OF THE INVENTION

The invention relates to a servo system, particularly a servo system for trip recorders for measuring, recording, and displaying the speed, whether the rotational speed (rpm) or linear speed (miles per hour), of a vehicle. The direct current signal proportional to the speed and the direct current signal proportional to the indicated speed are fed back to a comparison junction that compares these two signals. The junction is connected to the input means of the operational amplifier. The amplification factor for the difference voltage is controlled by a feedback path. The amplifier controls the direction of rotation of the servo motor that operates display and recording instruments.

The purpose of a trip recorder is to measure, record, and to display data that show the operation of the vehicle. Of particular importance, is the measurement of the speed of the vehicle and rotational speed of the engine. A trip recorder also indicates the distance travelled and the times that the driver is at the wheel and not at the wheel in separate time diagrams.

The trip recorder occupies a special place among comparable recorders. Since it is built into a vehicle, it is subject to voltage changes of the vehicle battery of as much as 40% of the regular voltage and to temperature variations between +70° C. and −30° C. Aside from this, it is shaken sometimes violently, by the road surface and by acceleration, the latter chiefly in the direction of forward movement. These quite unfavorable operating conditions for a measuring instrument are diametrically opposed to the requirement of an accurately recorded trip diagram. The recording on the diagram disk is used more and more today as evidence for determining guilt in an accident, for statistical purposes, and even as a basis for determining the salary of the driver.

The eddy current system is preferred today for most trip recorders, particularly because it is robust, but also because it is simple and cheap to manufacture. The nonlinear relationship between rpm and the angle of rotation and the high driving torque of this system must both be tolerated. The eddy current system, however, must be driven through a mechanical connection, such as a flexible shaft or a universal joint shaft.

It has been suggested to drive the eddy current system directly from an electric motor that is located at the trip recorder and which turns at the rpm that is to be measured. This scheme, which electrically transmits the quantity to be measured, avoids the well-known disadvantages of shafts: faulty operation and breakage at low temperatures, as well as a tendency to torsional vibration because of the usually unavoidable bends in the shaft necessitated by space limitations. This solution requires, however, a great deal of irreplaceable electrical energy in the vehicle, and is not only costly but also technically round about.

If the difficulties of mechanical drive are to be avoided, it would be more logical to employ with the electric transmission of the value to be measured an electric circuit for suitably preparing, or transforming, the value to be measured. The electric transmission can be in the form of pulses. Experiments along these lines have shown that only a measuring circuit using a balancing arrangement meets the requirements. In other words, a servo system having a comparision junction (mixing point), an amplifier, and servo motor.

It should be remarked, speaking generally of electric measuring systems, that in comparison with the electromechanical eddy current system with its unavoidably large masses, there are appreciably more and simpler opportunities to reduce dynamic error. A balancing measuring arrangement continuously compares the actual value with the desired value and, if the two values are not equal, the arrangement is adjusted until the difference between the two is zero. The special characteristics of a balancing arrangement (accuracy relatively immuned to variations in battery voltage and in amplifier gain, a high attainable adjusting power, and a nearly infinite input impedance at balance) can be advantageously used, particularly with apparatus that is subject to severe operating conditions.

As the following considerations will show, great demands are placed on the speed and accuracy of the servo system. The trip recorder must display and record over a wide range of rpms. Moreover, the vehicle speed often changes suddenly when shifting from one gear to another during fast acceleration or sharp braking. The recorded diagram, nevertheless, must show the true changes in the measured values if it is not to be useless as a record.

The electric servo systems previously suggested do not satisfy these demands. Even expensive and complicated feedback amplifiers, fundamentally differential amplifiers (German Pat. No. 1,229,325, also describes a magnetic amplifier), have too long a response time and are driven by the ever-present residual ripple in the signal of the desired value to cause the servo motor to over shoot. Moreover, the rated speed of the servo motor is insufficient, chiefly because of too little amplification in the output stage. In many instances, the output stage requires a high idling current, a fact that is intolerable in a motor vehicle. Since the servo motor tends to over shoot, because of insufficient balancing torque particularly when the measured value changes suddenly, the over shoot is fed back to the comparison junction, and the measured value is not accurately recorded. The motor's tendency to over shoot is encouraged by the inertia of the vibration prone parts of the recorder and display instruments that are connected to the motor.

Consequently, the accuracy of the displayed value over the required range is too unstable. Even the display itself in certain ranges, particularly at low rpms, was unstable. The chief disadvantage of previously tested servo systems was, however, that their susceptability to trouble made it questionable as to whether a stable controller action could be reproduced in system after system, as would be required for mass production.

SUMMARY OF THE INVENTION

An object of the invention is to provide for the aforesaid purpose a servo system that avoids these defects.

A further object of this invention is a servo system of the aforesaid object that has an amplifier with a precisely defined and stable gain and with low null point drift.

A still further object of the invention is a servo system of the preceding objects having a specially designed end stage and a servo motor that together with the amplifier comprise a servo system having a controller action that fulfills all requirements in the laboratory and that can be reproduced in mass production.

Briefly, the invention consists of an operational amplifier having input means and an output, first signal means for providing a first signal proportional to the speed of the vehicle, second signal means for providing a second signal proportional to the indicated speed, a comparison junction connected to the first and second signal means for comparing these first and second signals, this comparison junction being connected the operational amplifier input means, a servo motor for operating indicating means, and first and second push-pull output stages connected to the operational amplifier output and to the servo motor for controlling operation of the latter in dependence on the signal at the output.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
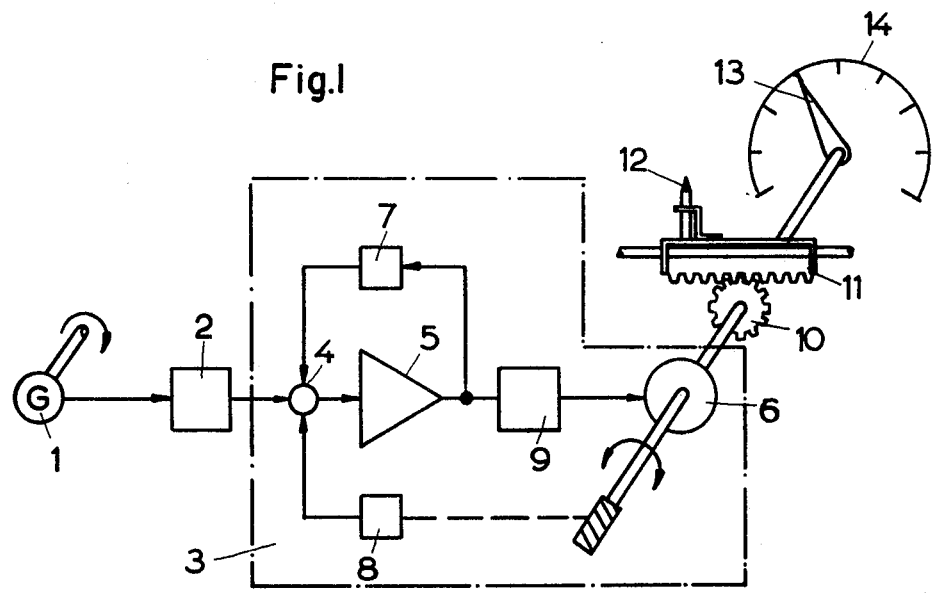
FIG. 1 is a block diagram of an electrical arrangement for measuring the rpm and/or speed of a vehicle.

With reference to the block diagram of FIG. 1, there is provided a generator 1 for delivering a signal proportional to the desired value of the parameter (rotational speed or linear speed). The generator, which can be connected to the drive output, can be a tacho generator or, preferably, a pulse generator. A smoothing circuit 2, which, for example, converts the frequency at the input into an analogue voltage, is connected to the output of the signal generator 1. The signal, thus prepared, from the stage 2 is conducted to the comparison junction 4 of the servo system 3. The output of the amplifier 5 and the actual position of the servo motor 6 are fed back to the junction 4. The box 7 denotes the feed-back coupling of the amplifier 5, and the box 8 denotes the circuit for converting the position of the servo motor 6 into an electrical signal that corresponds to the actual position of the servo motor. The output stage of the amplifier 5 is indicated by the box 9. The output stage controls the operation of the servo motor 6. Directly connected to the shaft of the motor are a gear 10, meshing with a toothed recording carriage 11 to drive a recorder 12, and a pointer 13 that cooperates with a scale 14. The gear 10 and/or pointer 12 can be indirectly connected to the motor shaft by a suitable drive arrangement.

Figure 2:
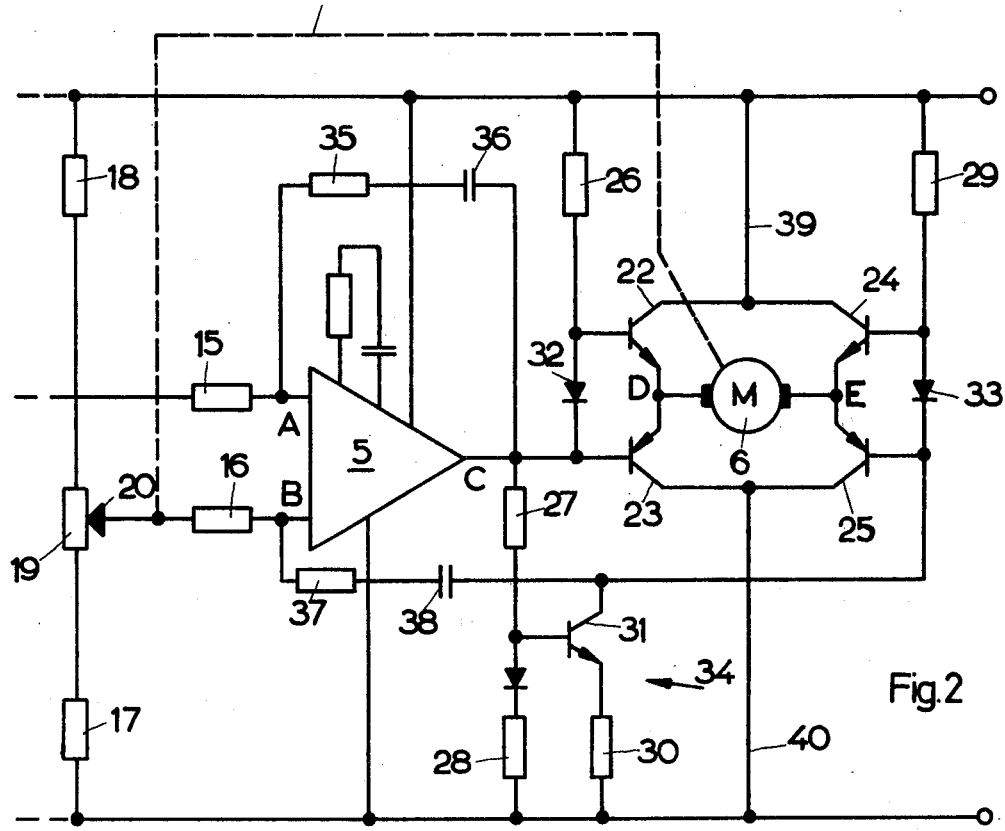
FIG. 2 is a wiring diagram of one embodiment of the servo system.

With reference to FIG. 2, which shows the wiring diagram for the servo system 3, the comparison junction 4 is incorporated into the operational amplifier 5. Of Control circuit means according to the invention is shown in FIG. 2 and includes components 22 – 40. course, the output stage 9 can also be incorporated into the amplifier 5 so as to form a complete unit. The particular output stage and the operational amplifier chosen together compose one of the features of the invention.

The operational amplifier 5 (excluding the output stage) was designed for an analog computer, and is a precision amplifier fully equal to the demands of accurate measurement, including the demands of a trip recorder. The operational amplifier consists essentially of the direct current, modulator, amplifier and of an alternating current amplifier, which together insure a high, precise, stable, gain and low null point drift. Suitable feedback enables the desired controller action to be obtained relatively easily.

The operational amplifier is a commercial, ready to operate, unit having differential input means comprising two inputs A and B. A coupling resistor 15 connects the input A to the output of the shaping stage 2, a coupling resistor 16 connects the input B to the signal proportional to the indicated speed. This latter signal is provided by a voltage divider consisting of two fixed resistors 17 and 18 and a potentiometer 19. In accordance with the invention, the potentiometer can be replaced by a contractless equivalent circuit, not shown. The tap 20 of the potentiometer 19 is positioned by a mechanical link 21 connected to the servo motor 6. The forward and backward operation of the direct current servo motor 6 is controlled by two complementary-symmetry, push-pull, output stages connected to the output C of the operational amplifier 5. These two output stages are respectively composed of transistors 22, 23 and 24, 25. The two voltage dividers—one composed of the resistors 26, 27 and 28, and the other composed of the two resistors 29 and 30 and of fifth transistor 31—ensure that the junctions D and E of the output stages are at one-half of the battery voltage $U_B$, when the system is in balance. No current flows through the servo motor 6, and the output C of the operational amplifier is also at one-half $U_B$. The two diodes 32 and 33 compensate the threshold voltage of the base-emitter diodes of the respective transistor pairs 22, 23 and 24, 25, so as to eliminate the non-responsive region of these transistors. As a consequence, even the smallest rise or fall in voltage at the output G acts to control the conductivity of the input transistors and thereby to control operation of the servo motor 6. Since the operational amplifier has only a single output, it is essential in the output stages to provide a signal that is complementary to the signal at the output C. This complementary signal is provided by the phase inverting stage 34. The feedback connections to the inputs A and B of the operational amplifier 5 are provided, on the one hand, by the series connected resistor 35 and capacitor 36 and, on the other hand, by the series connected resistor 37 and capacitor 38.

As is well known, a suitably designed feedback reduces transmission distortions and errors of the entire servo system. The feedback consequently determines the efficiency of the regulation: in other words, the time that is required until the deviation is negligibly small. Since the shaping stage 2 can never completely smooth the voltage at its input, the signal at the input A of the operational amplifier contains a residual ripple, which, amplified by the amplifier 5, is conducted to the servo motor 6. The feedback must attenuate this residual ripple. A purely proportional action of the feedback would cause the operational amplifier to be over driven at the required amplification factor provided by the amplifier. With a purely derivative control, the ripple is increased because the amplification rises with rising frequency. The chosen feedback ensures that the operational amplifier essentially provides an integrated control, the feedback being so proportioned that the amplification factor is not unduly lowered. In accordance with the invention, the ability to integrate linearly over a wide range—in other words, to carry out real integration—while having the high amplification required for accuracy is obtained by the choice of the operational amplifier. That the controlling action of the operational amplifier can be solely determined by the circuit external to the amplifier is particularly important for mass production.

The control accuracy of the operational amplifier can be reduced by an inaccurate feedback of the indicated speed to the input B. For this reason, it is essential that the end stage (transistors 22 to 25) has an accuracy of the order of that of the operational amplifier, so that even the smallest change in the signal at the output A causes a precise movement of the potentiometer tap 20. The operation of the end stage of the invention will now be described.

When the bridge, composed of the voltage dividers 26 to 28, on the one hand, and 29 to 31, on the other, and of the transistors 22 to 25 (forming the diagonal of the bridge) is in balance, junction C and motor terminals D, E are at one-half $U_B$, and no current flows through the servo motor 6. If the signal at the input A changes so that the voltage at the output C rises, the transistor 22 becomes more conductive and the transistor 23 less conductive. At the same time, the rise in voltage at the output C acts on the base of the transistor 31. As an npn transistor, this transistor becomes more conductive, causing the voltage at the bases of the transistors 24 and 25 to fall, whereby transistor 24 becomes less conductive and transistor 25 mre conductive. A motor control current flows through the supply line 39, the transistor 22, the motor 6, the transistor 25, and the supply line 40. If the voltage at the output C falls, a motor control current flows through the transistor 24, the motor 6, and the transistor 23, causing the motor to turn in the other direction.

The inertia of the moving parts of the motor and of the driven recorder and indicator will cause the motor 6 to move past the desired point, particularly if the signals from the smoothing circuit 2 change rapidly in value. This fault, which is corrected by the end stage of the invention, intolerably loads the entire control loop. The transistors 22 to 25 are connected as emitter followers, so that their conductivity is controlled not only by their bases, but also by the motor 6. If the inertia of the motor causes the motor to move past the point at which it should stop, it operates as a generator of which the output voltage opposes the effect of the voltages at the bases of these transistors. If, for example, the transistors 22 and 25 have been conducting, they are now made less conductive and the transistors 23 and 24 are turned on, permitting a braking current to flow that opposes further rotation of the motor in the same direction and thereby prevents over shooting.

The improvement over the prior art lies particularly in the combination of the operational amplifier with the end stage of the invention, which combination insures, for the entire servo system, the required optimum control action in the chosen application. This means that the favorable dynamic control action of the operational amplifier is not, as is usually the case with servo systems, adversely affected by the end stage connected to the operational amplifier. Moreover, since the operational amplifier is a commercial unit its quality is guaranteed and, as a mass-produced article, the amplifier offers stable operation.

Particularly advantageous is the fact that a circuit connected externally to the encapsulated operational amplifier and an end stage ensure, for mass production, the necessary reproducibility of the control action of the entire servo system.

The end stage of the invention has the further advantage that when it is balanced, it draws no current. The battery is not loaded, as is the case, for example, with voltage dividers of known servo systems, in which the voltage dividers establish an artificial, low ohmage, null point. Moreover, in either direction of rotation, the motor 6 is connected across the full battery voltage, a fact that appreciably reduces the time required for the motor to reach rated rpm.

It will be understood that each of the elements described above, or two or more together, may also find a useful application in other types of circuits differing from the types described above.

While the invention has been illustrated and described as embodied in a servo system for a trip recorder, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. A servo system for vehicle trip recorders, comprising, in combination, first signal generating means for providing a first signal dependent upon the speed of the vehicle; second signal generating means for providing a second signal dependent upon the indicated speed; operational amplifier circuit means having differential input means connected with said first and second signal generating means and having output means and operative for producing at said output means output signals dependent upon the difference between said first and second signals, said operational amplifier circuit means including negative-feedback means connecting said output means to said input means for establishing a preselected relationship between said output signal and said first and second signals by feeding back to said input means feedback signals having a preselected relationship to said output signals; a servomotor for operating indicating means and having two motor terminals; control circuit means comprising supply lines for connection with an electrical supply and further comprising first and second push-pull output stages connected to said output means of said operational amplifier circuit means and to said servo motor for controlling operation of the latter in dependence on said output signals, said push-pull output stages each comprising two complementary-symmetry transistors whose emitters are connected with each other and with one of said motor terminals, and whose collectors are connected with respective ones of said supply lines, the voltages at the bases of said complementary-symmetry transistors being a function of the magnitude and sign of said output signals and determining the direction of current flow into and out of said motor terminals; first and second voltage dividers connected between two voltages, the bases of the two transistors of each push-pull output stage being connected with one of said first and second voltage dividers to form an electrical bridge composed of said first and second voltage dividers and of the four said transistors, said transistors composing the diagonal of said bridge; and diode means connected in series in each of said first and second voltage dividers, each of said diode means being connected between the bases of the two transistors of the respective output stage for compensating the threshold voltage of the base-emitter diodes of said two transistors.

2. A servo system for vehicle trip recorders, comprising, in combination, first signal generating means for providing a first signal dependent upon the speed of the vehicle; second signal generating means for providing a second signal dependent upon the indicated speed; operational amplifier circuit means having differential input means connected with said first and second signal generating means and having output means and operative for producing at said output means output signals dependent upon the difference between said first and second signals, said operational amplifier circuit means including negative-feedback means connecting said output means to said input means for establishing a preselected relationship between said output signal and said first and second signals by feeding back to said input means feedback signals having a preselected relationship to said output signals; a servomotor for operating indicating means and having two motor terminals; control circuit means comprising supply lines for connection with an electrical supply and further comprising first and second push-pull output stages connected to said output means of said operational amplifier circuit means and to said servo motor for controlling operation of the latter in dependence on said output signals, said push-pull output stages each comprising two complementary-symmetry transistors whose emitters are connected with each other and with one of said motor terminals, and whose collectors are connected with respective ones of said supply lines, the voltages at the bases of said complementary-symmetry transistors being a function of the magnitude and sign of said output signals and determining the direction of current flow into and out of said motor terminals; first and second voltage dividers connected between two voltages, the bases of the two transistors of each push-pull output stage being connected with one of said first and second voltage dividers to form an electrical bridge composed of said first and second voltage dividers and of the four said transistors, said transistors composing the diagonal of said bridge, one of said first and second voltage dividers including a variably conductive element the conductivity of which is controlled by the signal at said output means.

3. A servo system as defined in claim 2, wherein a tap of said first voltage divider is connected to said operational amplifier output, said variably conductive element being a fifth transistor and part of said second voltage divider, the base of said fifth transistor being connected to a tap of said first voltage divider.

4. A servo system as defined in claim 3, wherein said fifth transistor is connected to provide phase inversion at its output.

5. A servo system for vehicle trip recorders, comprising, in combination, first signal generating means for providing a first signal dependent upon the speed of the vehicle; second signal generating means for providing a second signal dependent upon the indicated speed; operational amplifier circuit means having differential input means connected with said first and second signal generating means and having output means and operative for producing at said output means output signals dependent upon the difference between said first and second signals, said operational amplifier circuit means including negative-feedback means connecting said output means to said input means for establishing a preselected relationship between said output signal and said first and second signals by feeding back to said input means feedback signals having a preselected relationship to said output signals; a servomotor for operating indicating means and having two motor terminals; control circuit means comprising supply lines for connection with an electrical supply and further comprising first and second push-pull output stages connected to said output means of said operational amplifier circuit means and to said servo motor for controlling operation of the latter in dependence on said output signals, said push-pull output stages each comprising two complementary-symmetry transistors whose emitters are connected with each other and with one of said motor terminals, and whose collectors are connected with respective ones of said supply lines, the voltages at the bases of said complementary-symmetry transistors being a function of the magnitude and sign of said output signals and determining the direction of current flow into and out of said motor terminals; first and second voltage dividers connected between two voltages, the bases of the two transistors of each push-pull output stage being connected with one of said first and second voltage dividers to form an electrical bridge composed of said first and second voltage dividers and of the four said transistors, said transistors composing the diagonal of said bridge; and diode means connected in series in each of said first and second voltage dividers, each of said diode means being connected in parallel with the base emitter path of the respective output stage.

* * * * *